US012096174B2

(12) United States Patent
Lee et al.

(10) Patent No.: US 12,096,174 B2
(45) Date of Patent: Sep. 17, 2024

(54) HEADPHONE

(71) Applicant: Merry Electronics(Shenzhen) Co., Ltd., ShenZhen (CN)

(72) Inventors: Wen-Chung Lee, Taichung (TW); Yung-Lung Tsai, Taichung (TW); Hung-Wen Tsao, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 219 days.

(21) Appl. No.: 17/969,667

(22) Filed: Oct. 19, 2022

(65) Prior Publication Data

US 2024/0089645 A1 Mar. 14, 2024

(30) Foreign Application Priority Data

Sep. 14, 2022 (TW) ................................. 111134649

(51) Int. Cl.
*H04R 1/10* (2006.01)

(52) U.S. Cl.
CPC .................................. *H04R 1/1008* (2013.01)

(58) Field of Classification Search
CPC ........ H04R 1/10; H04R 1/1008; H04R 1/105; H04R 1/1066; H04R 1/1091
See application file for complete search history.

(56) References Cited

U.S. PATENT DOCUMENTS

2021/0051390 A1* 2/2021 He ...................... H04R 1/1066

* cited by examiner

*Primary Examiner* — Kile O Blair
(74) *Attorney, Agent, or Firm* — JCIPRNET

(57) ABSTRACT

A headphone includes a headgear and two earmuffs connected to opposite ends of the headgear, and each of the earmuffs includes an adjustment assembly. The adjustment assembly includes a base, two elastic members, two protrusions, and two sliding blocks. The base has two opposite accommodating parts and two guiding grooves. The elastic members are disposed in the accommodating parts, respectively, and the elastic members extend along a first axial direction. The protrusions are slidably connected to the guiding grooves, respectively, and protrude into the accommodating parts. The sliding blocks are disposed in the accommodating parts, respectively, and each of the sliding blocks is respectively connected between the corresponding protrusion and the corresponding elastic member.

10 Claims, 6 Drawing Sheets

HEADPHONE

CROSS-REFERENCE TO RELATED APPLICATION

This application claims the priority benefit of Taiwan application serial no. 111134649, filed on Sep. 14, 2022. The entirety of the above-mentioned patent application is hereby incorporated by reference herein and made a part of this specification.

BACKGROUND

Technical Field

The disclosure relates to an earphone device, and in particular, to a headphone.

Description of Related Art

With the rapid development of science and technology, the development of various electronic products is more rapid, among which earphones may be used as a medium for sound transmission between electronic devices and human ears to transmit sound information to human ears.

For the headphone, due to the different head shape of each person, some users will feel uncomfortable because the earmuffs do not fit the contour of the head when wearing the headphone. Therefore, further design is required in order to further improve the adjustment freedom of the earmuffs.

SUMMARY

The disclosure provides a headphone, which can improve the adjustment freedom of the earmuffs and may greatly reduce the manufacturing cost.

The headphone of the disclosure includes a headgear and two earmuffs connected to opposite ends of the headgear, and each of the earmuffs includes an adjustment assembly. The adjustment assembly includes abase, two elastic members, two protrusions, and two sliding blocks. The base has two opposite accommodating parts and two guiding grooves. The elastic members are disposed in the accommodating parts, respectively, and the elastic members extend along a first axial direction. The protrusions are slidably connected to the guiding grooves, respectively, and protrude into the accommodating parts. The sliding blocks are disposed in the accommodating parts, respectively, and each of the sliding blocks is respectively connected between the corresponding protrusion and the corresponding elastic member. When an external force is applied to each of the earmuffs and causes each of the earmuffs to expand outward at an angle in a second axial direction of the first axial direction, each of the earmuffs drives the corresponding base, so that each of the protrusions moves in each of the guiding grooves, and pushes each of the sliding blocks to move along the first axial direction to compress each of the elastic members. When the external force is removed, each of the earmuffs is reset by the elastic force of each of the elastic members.

In an embodiment of the disclosure, each of the above-mentioned earmuffs further includes a shell and a front cover. The shell has an open end and a bottom wall. The front cover covers the open end of the shell, and each of the adjustment assemblies is respectively connected between the headgear and the corresponding bottom wall.

In an embodiment of the disclosure, each of the above-mentioned earmuffs further includes a speaker. The speaker is disposed in an accommodating space jointly formed by the shell and the front cover. The speaker has a sound outlet surface, the sound outlet surface of the speaker faces an inner surface of the front cover, and the inner surface faces the bottom wall.

In an embodiment of the disclosure, each of the above-mentioned guiding grooves has a first section and a second section connected to the first section, the first section is parallel to the first axial direction, and the second section extends from an end of the first section in a direction inclined to the first axial direction.

In an embodiment of the disclosure, each of the above-mentioned sliding blocks has an inclined surface and a bottom surface, each of the bottom surfaces is connected to one end of each of the elastic members, and each of the inclined surfaces is inclined to the first axial direction.

In an embodiment of the disclosure, each of the above-mentioned inclined surfaces abuts against each of the protrusions. When the external force is applied to each of the earmuffs, each of the protrusions moves from the first section to the second section, and moves from a first abutting position to a second abutting position of the inclined surface to push each of the sliding blocks. A first distance between the first abutting position and the bottom surface is smaller than a second distance between the second abutting position and the bottom surface.

In an embodiment of the disclosure, the above-mentioned base further includes two first sidewalls and two second sidewalls connected to the first sidewalls. Each of the guiding grooves is formed on each of the first sidewalls, each of the second sidewalls corresponds to each of the bottom surfaces, and each of the second sidewalls is connected to the other end of each of the elastic members.

In an embodiment of the disclosure, extending directions of the above-mentioned second sidewalls are parallel to the second axial direction, and extending directions of the first sidewalls are parallel to the first axial direction.

In an embodiment of the disclosure, each of the above-mentioned adjustment assemblies further includes a rod member and a sleeve. The rod member has a first end and a second end that are opposite to each other, the first end is connected to the headgear, and an extending direction of the second end has a rotation axial direction. The sleeve is disposed between the accommodating parts of the base, and the sleeve includes two pivot parts and has a hollow part. The second end is connected to the hollow part, and the pivot parts are pivotally connected to the first sidewalls.

In an embodiment of the disclosure, each of the above-mentioned adjustment assemblies further includes a positioning member. The positioning member is sleeved on a part where the second end passes through the hollow part, and the positioning member includes a baffle plate, which is configured to restrict a rotation angle of each of the earmuffs on the rotation axial direction of the second end.

Based on the above, in the headphone of the disclosure, the earmuffs may be adjusted through the adjustment assemblies to adapt to the head shape of the user. After the user takes off the headphone, the earmuffs may be automatically reset by the elastic force of the elastic members in the adjustment assemblies. Therefore, the headphone of the disclosure can improve the adjustment freedom of the earmuffs, and may greatly reduce the manufacturing cost.

In order to make the aforementioned features and advantages of the disclosure comprehensible, embodiments accompanied with drawings are described in detail as follows.

DESCRIPTION OF THE EMBODIMENTS

Figure 1:
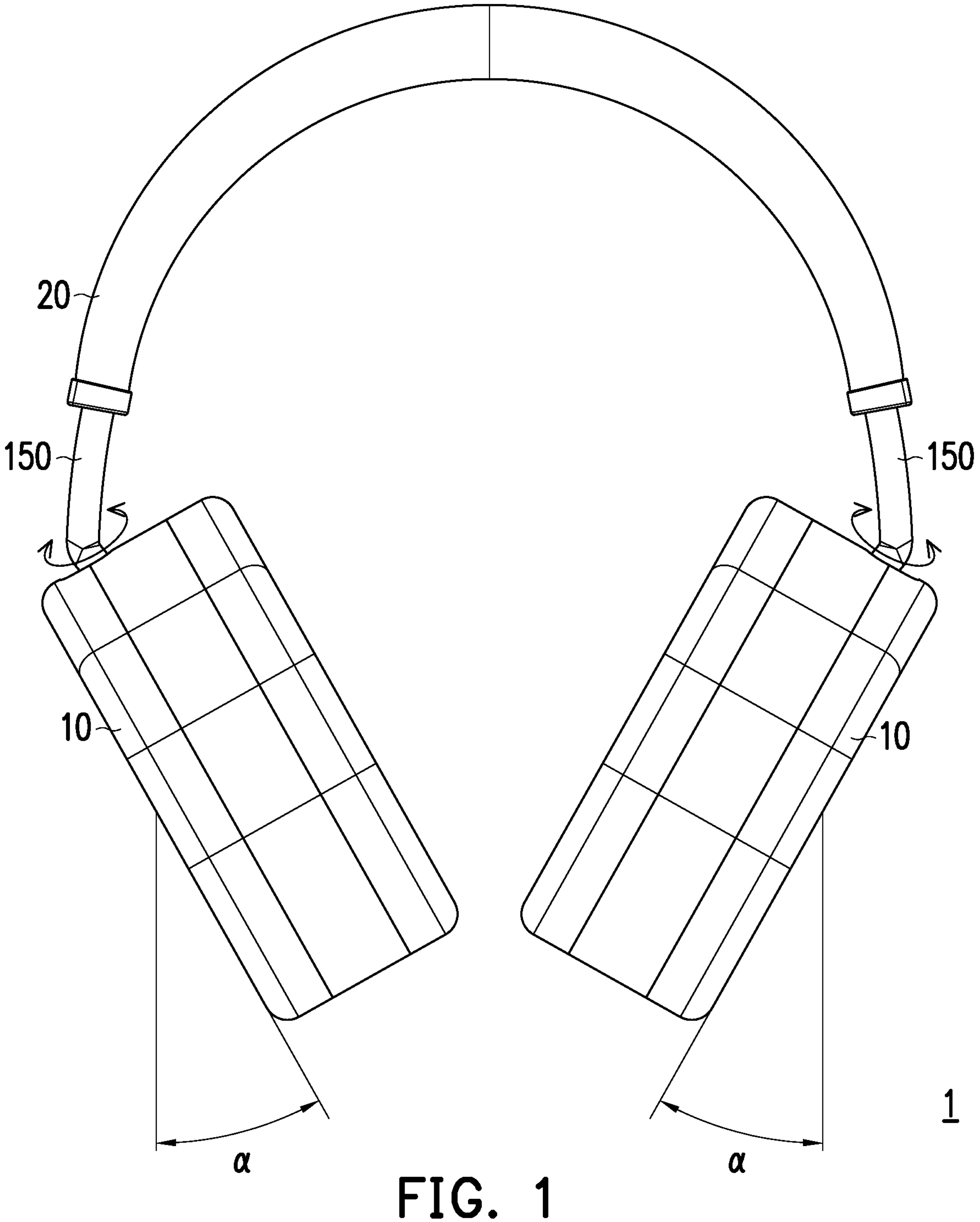
FIG. 1 is a front view of a headphone according to an embodiment of the disclosure.

FIG. 1 is a front view of a headphone according to an embodiment of the disclosure. Referring to FIG. 1, a headphone 1 includes a headgear 20 and two earmuffs 10 connected to opposite ends of the headgear 20. The two earmuffs 10 respectively correspond to the left ear and the right ear of a user. The headgear 20 may be extended or shortened by an adjustment mechanism (not shown), and the method of adjusting the length of the headgear 20 is not limited herein. In the embodiment, the headphone 1 is, for example, a wireless earphone device, but the disclosure is not limited thereto. It should be noted that, since the components of the earmuffs of the left ear and the right ear are actually the same, the following description is to take one of the two earmuffs as an example for description.

Figure 2A:
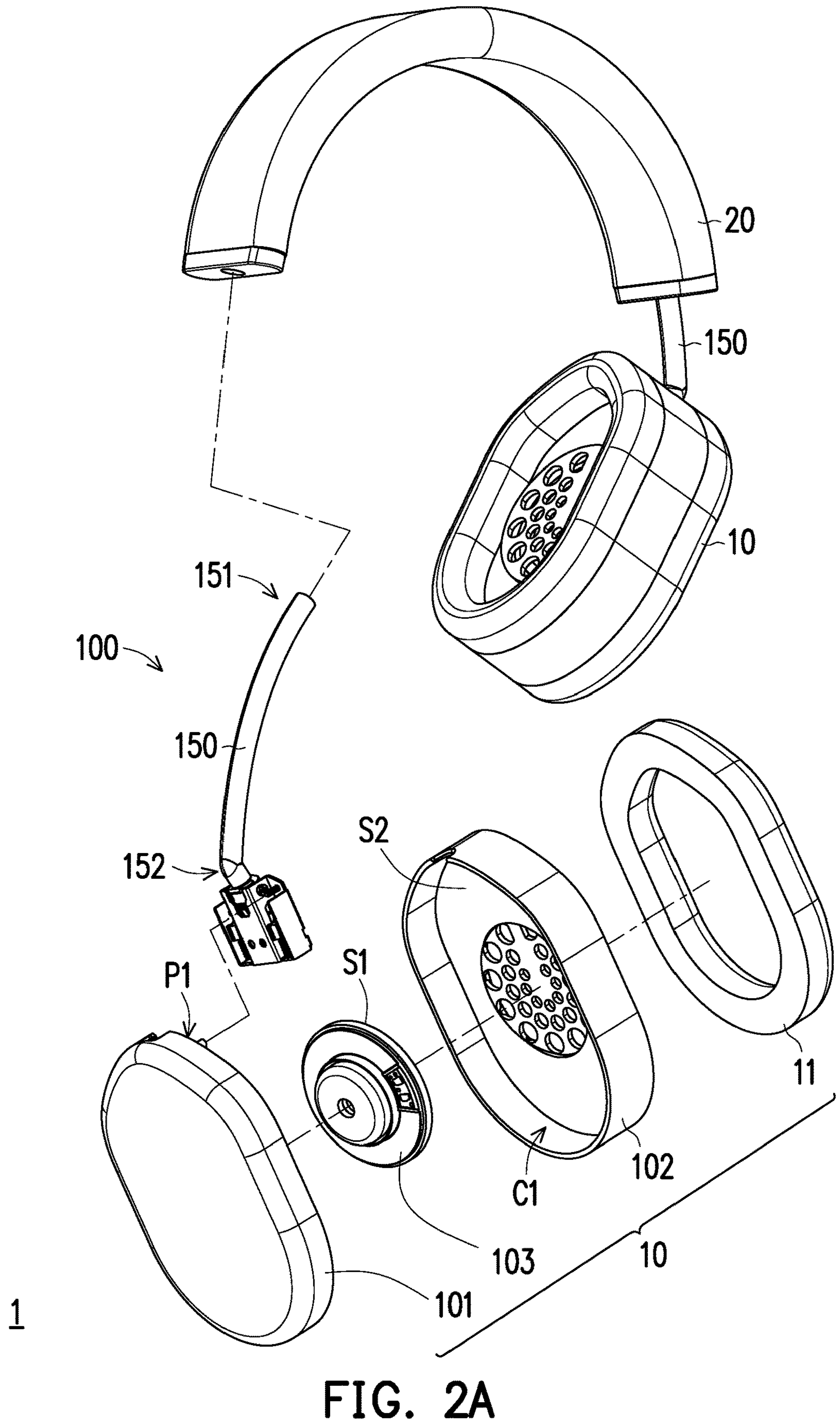
FIGS. 2A and 2B are disassembled views of the headphone of FIG. 1.
Figure 2B:
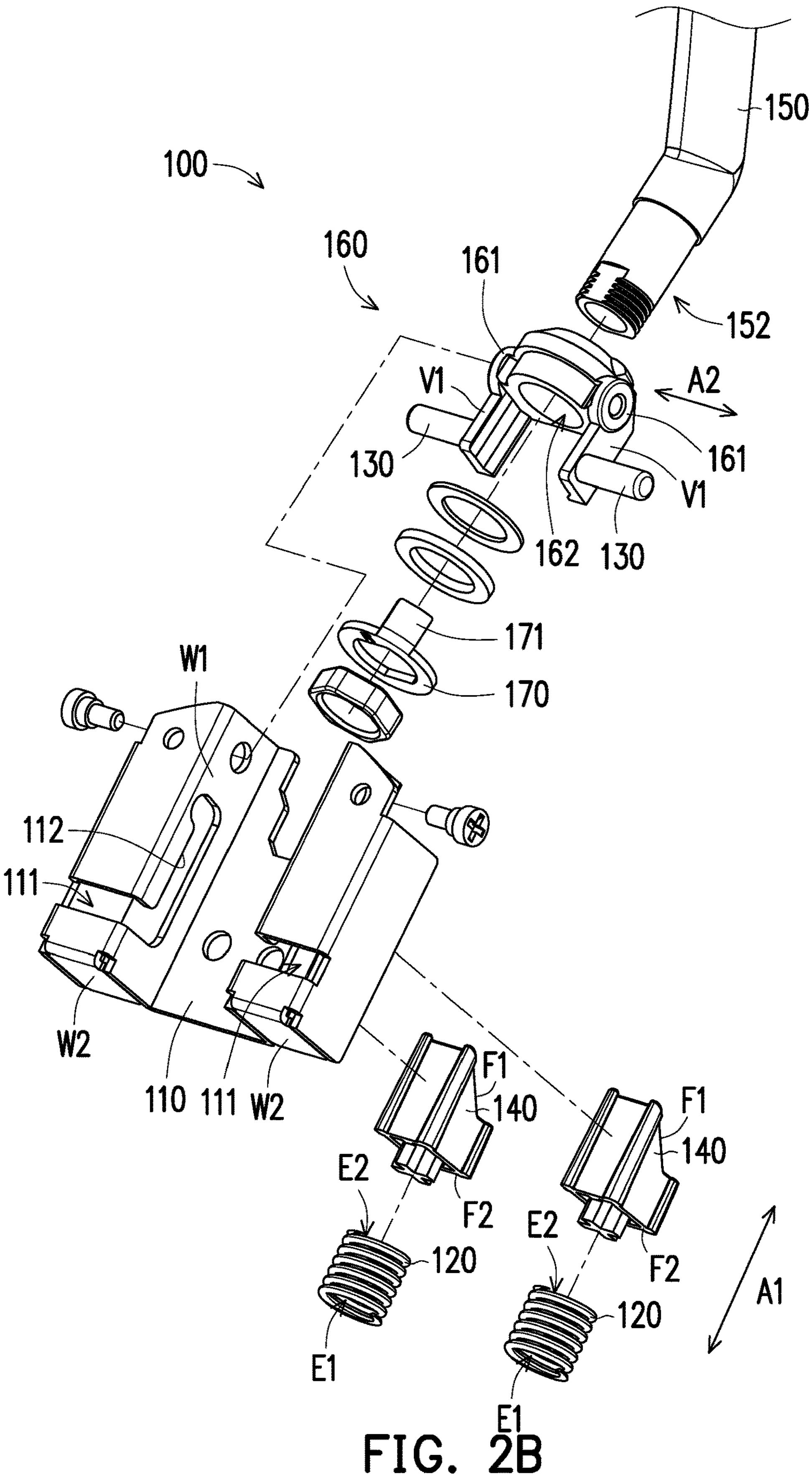
Figure 3:
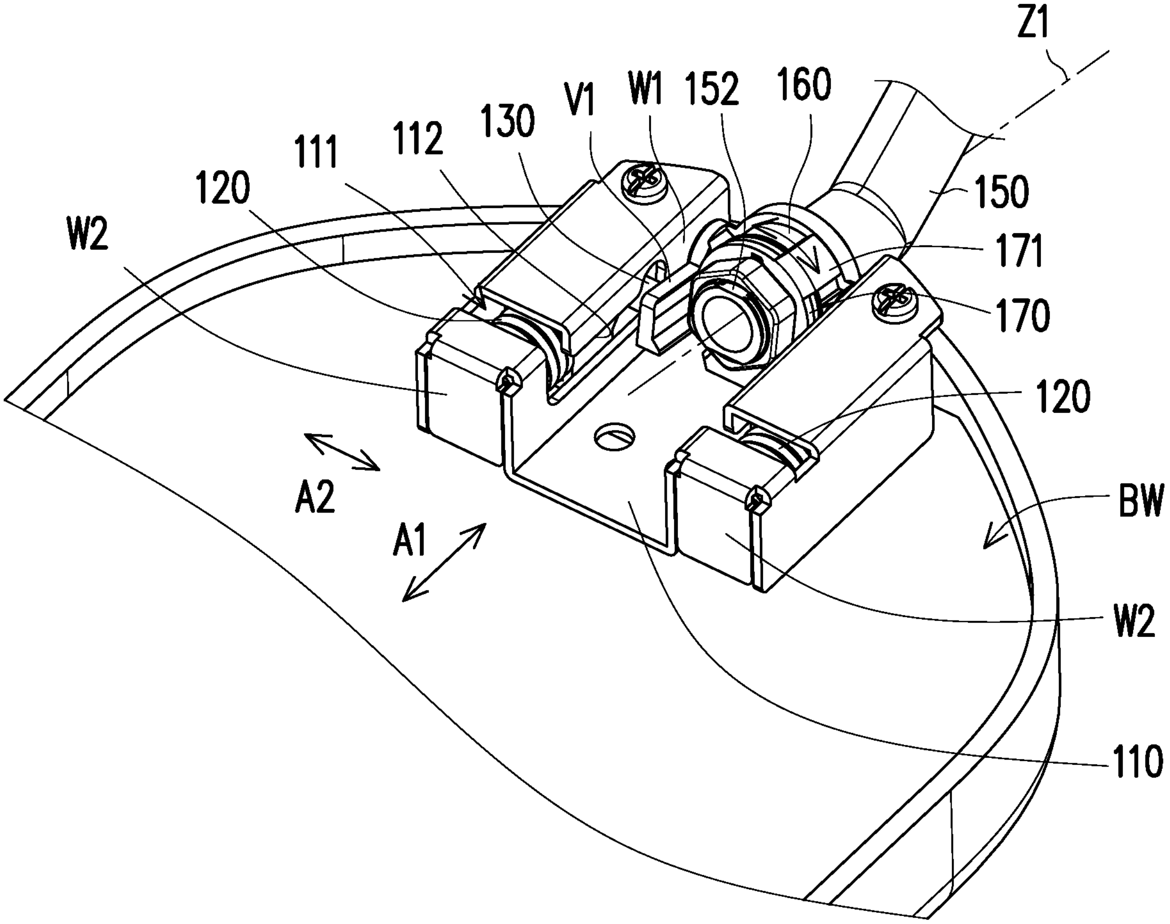
FIGS. 3 and 4 are schematic diagrams of some elements of the headphone of FIG. 1 from different viewing angles.
Figure 4:
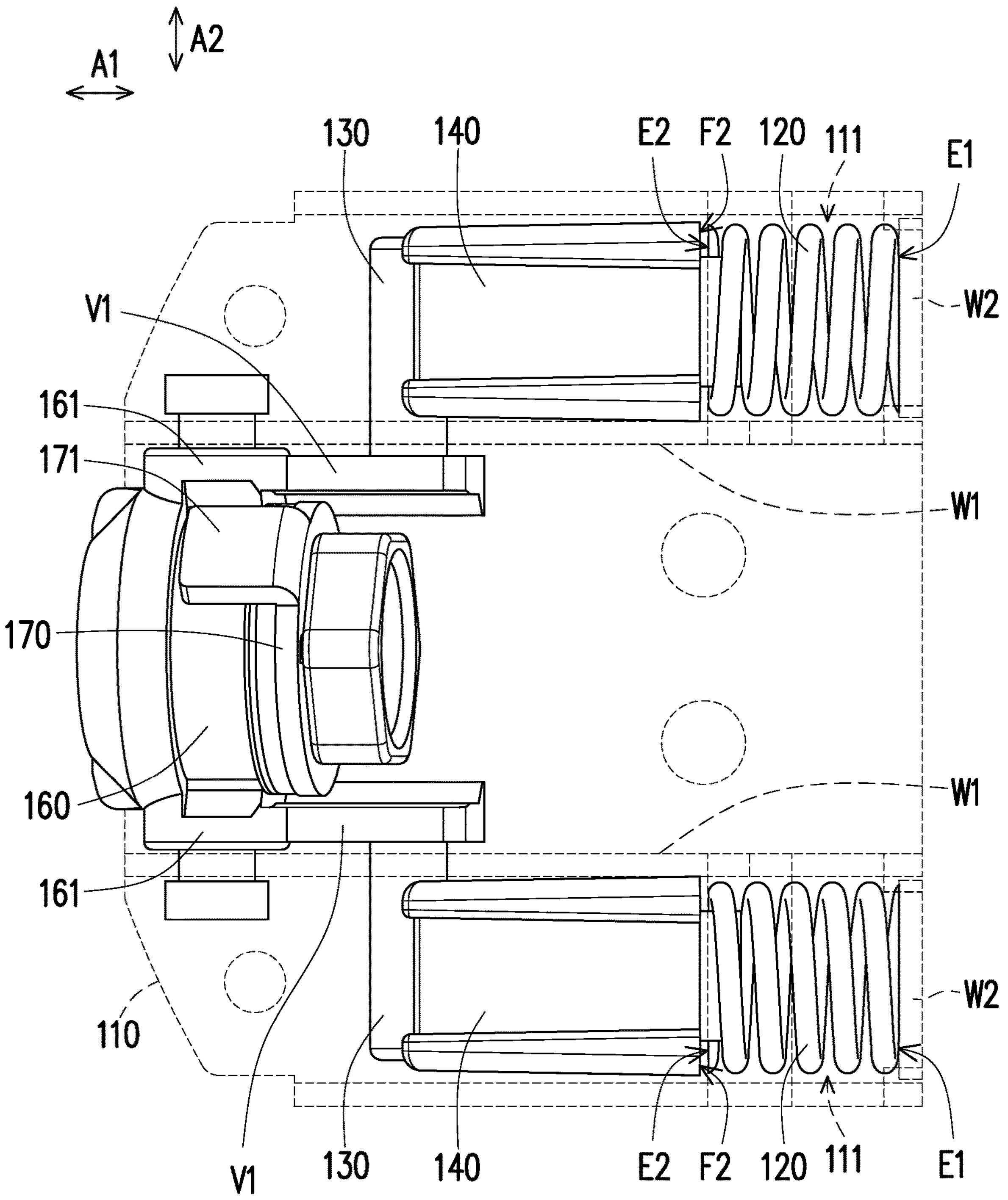

FIGS. 2A and 2B are disassembled views of the headphone of FIG. 1. FIGS. 3 and 4 are schematic diagrams of some elements of the headphone of FIG. 1 from different viewing angles. Referring first to FIG. 2A, in the embodiment, the earmuff 10 includes a shell 101, a front cover 102, and an ear pad 11. The shell 101 has an open end P1. The front cover 102 covers the open end P1 of the shell 101. The material of the ear pad 11 includes foam, and the foam may be covered with a leather outer layer or a cloth outer layer, or may use flocking foam, which is not limited by the disclosure.

In the embodiment, the earmuff 10 further includes a speaker 103. The speaker 103 is disposed in an accommodating space C1 jointly formed by the shell 101 and the front cover 102. The speaker 103 has a sound outlet surface S1, and the sound outlet surface S1 of the speaker 103 faces an inner surface S2 of the front cover 102, so that the sound produced by the speaker 103 can be more smoothly transmitted to the user's ear canal.

In detail, referring to FIGS. 2A and 3, the shell 101 has a bottom wall BW. The earmuff 10 of the embodiment includes an adjustment assembly 100, and the adjustment assembly 100 is connected between the headgear 20 and the bottom wall BW. In the embodiment, the inner surface S2 of the front cover 102 and the bottom wall BW of the shell 101 face each other, which is not limited by the disclosure.

Referring to FIGS. 2B and 3, in the embodiment, the adjustment assembly 100 includes a base 110, two elastic members 120, two protrusions 130, and two sliding blocks 140. The base 110 has two opposite accommodating parts 111 and two guiding grooves 112. The protrusion 130 is slidably connected to the guiding groove 112. The elastic member 120 extends along a first axial direction A1 and is disposed in the accommodating part 111. In the embodiment, the protrusion 130 is a cylinder, but the disclosure is not limited thereto.

Referring to FIG. 4, in the embodiment, the sliding blocks 140 are disposed in the accommodating parts 111, respectively, and the protrusions 130 protrude into the accommodating parts 111. Each of the sliding blocks 140 is respectively connected between the corresponding protrusion 130 and the corresponding elastic member 120.

Figure 5A:
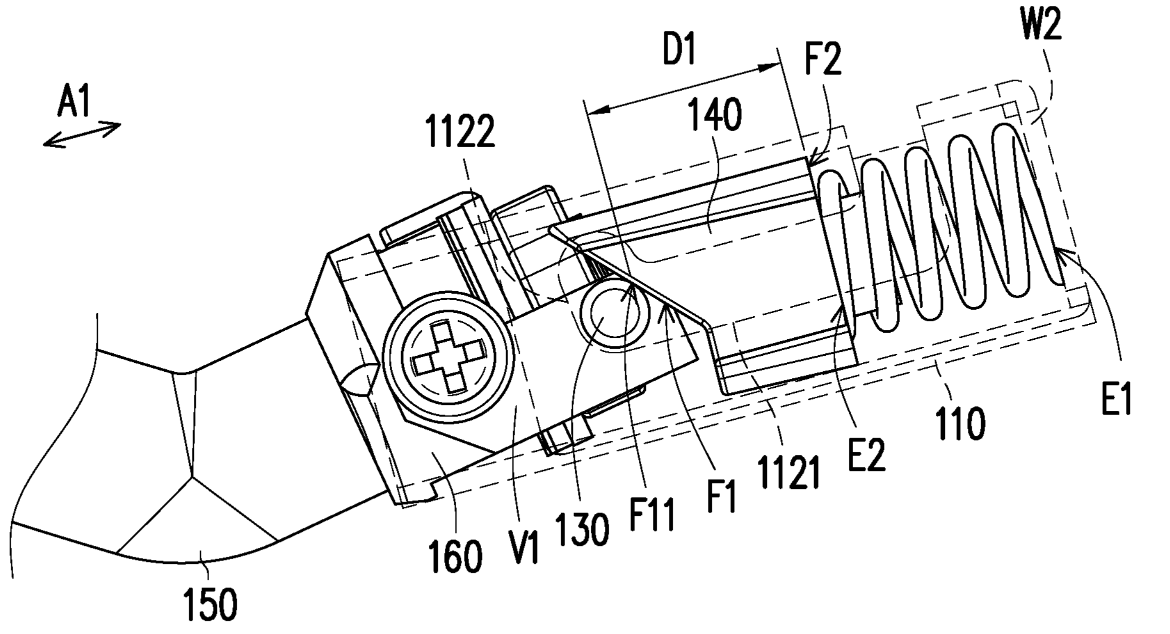
FIGS. 5A and 5B are schematic diagrams of the operation of the headphone of FIG. 1.
Figure 5B:
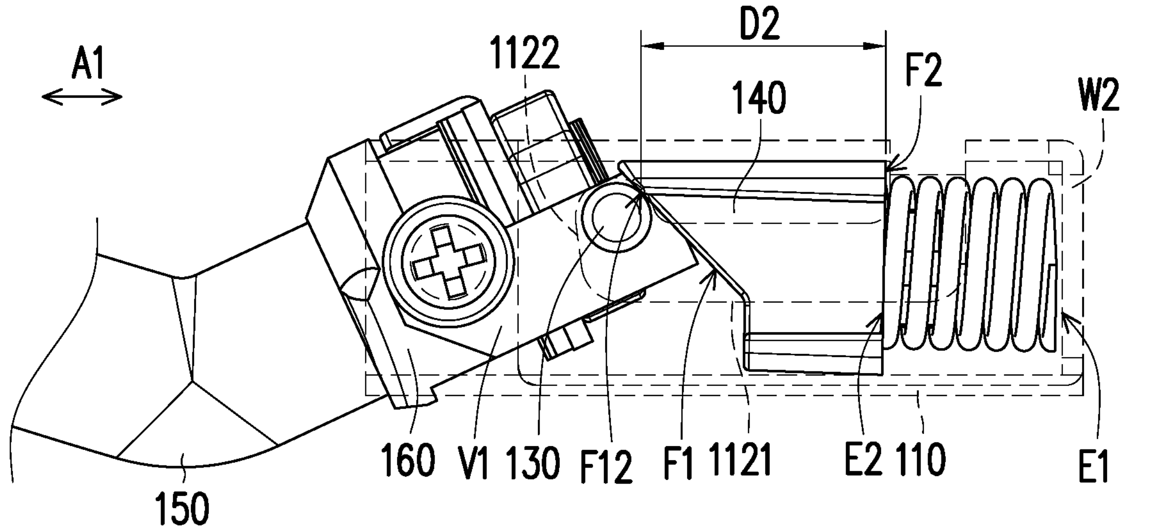

FIGS. 5A and 5B are schematic diagrams of the operation of the headphone of FIG. 1. In the embodiment, when an external force is applied to the earmuff 10 and causes the earmuff 10 to expand outward by an angle $\alpha$ on a second axial direction A2, the earmuff 10 drives the base 110, so that the protrusion 130 moves in the guiding groove 112 and pushes the sliding block 140 to move along the first axial direction A1 to compress the elastic member 120 as shown in FIG. 5B. When the external force is removed, the earmuff 10 is reset from the state shown in FIG. 5B to the initial state of FIG. 5A by the elastic force of the elastic member 120. In the embodiment, the angle $\alpha$ is, for example, about 15 degrees, but the disclosure is not limited thereto.

Under the above configuration, the headphone 1 can improve the adjustment freedom of the earmuff 10, and may greatly reduce the manufacturing cost.

In more detail, please refer to FIGS. 5A and 5B. In the embodiment, the guiding groove 112 has a first section 1121 and a second section 1122 connected to the first section 1121, the first section 1121 is parallel to the first axial direction A1, and the second section 1122 extends from an end of the first section 1121 in a direction inclined to the first axial direction A1.

In the embodiment, the sliding block 140 has an inclined surface F1 and a bottom surface F2, the bottom surface F2 is connected to an end E2 of the elastic member 120, and the inclined surface F1 is inclined to the first axial direction A1. The displacement distance of the sliding 140 may be adjusted by adjusting the length of the inclined surface F1 to change the compression amount of the elastic member 120.

In the embodiment, the inclined surface F1 abuts against the protrusion 130. When the external force is applied to the earmuff 10, the protrusion 130 moves from the first section 1121 to the second section 1122, and moves from a first abutting position F11 shown in FIG. 5A to a second abutting position F12 shown in FIG. 5B to push the sliding block 140 toward the direction of the elastic member 120. In the embodiment, a first distance D1 between the first abutting position F11 and the bottom surface F2 of the sliding block 140 is smaller than a second distance D2 between the second abutting position F12 and the bottom surface F2 of the sliding block 140.

Further, please refer to FIGS. 2B and 3. In the embodiment, the base 110 further includes two first sidewalls W1 and two second sidewalls W2 connected to the two first sidewalls W1, and the guiding groove 112 is formed in the first sidewall W1. The second sidewall W2 corresponds to the bottom surface F2 of the sliding block 140, and the second sidewall W2 is connected to an end E1 of the elastic member 120. In the embodiment, the first sidewall W1 and the second sidewall W2 are both perpendicular to the bottom wall BW.

In the embodiment, the extending directions of the second sidewalls W2 are parallel to the second axial direction A2, the extending directions of the first sidewalls W1 are parallel to the first axial direction A1, and here, the first axial direction A1 is perpendicular to the second axial direction A2, but the disclosure is not limited thereto.

Referring to FIGS. 2A and 2B, in the embodiment, the adjustment assembly 100 further includes a rod member 150. The rod member 150 has a first end 151 and a second end 152 that are opposite to each other, and the first end 151 is connected to the headgear 20. That is to say, the opposite ends of the headgear 20 in the embodiment are connected to the earmuffs 10 through the rod members 150, but the disclosure is not limited thereto.

In the embodiment, the adjustment assembly 100 further includes a sleeve 160. The sleeve 160 includes two pivot parts 161 and has a hollow part 162. The second end 152 is connected to the hollow part 162, and the pivot part 161 is pivotally connected to the first sidewall W1 of the base 110, so that the rod member 150 can rotate along the second axial direction A2 with the sleeve 160.

Referring to FIG. 3, in the embodiment, the extending direction of the second end 152 of the rod member 150 has a rotation axial direction Z1.

Referring to FIG. 4, in the embodiment, the sleeve 160 is disposed between the accommodating parts 111 of the base 110. Here, the sleeve 160 includes the pivot parts 161, plate bodies V1, and the protrusions 130, which are integrally formed, but the disclosure is not limited thereto. Specifically, the two protrusions 130 are respectively connected to the two pivot parts 161 through the two plate bodies V1, and the two pivot parts 161, the two protrusions 130, and the two plate bodies V1 are disposed on opposite sides of the hollow part 162, but the disclosure is not limited thereto.

In the embodiment, each of the adjustment assemblies 100 further includes a positioning member 170. The positioning member 170 is sleeved on the part where the second end 152 of the rod member 150 passes through the hollow part 162. The positioning member 170 includes a baffle plate 171, which is configured to restrict the rotation angle of each of the earmuffs 10 on the rotation axial direction Z1 of the second end 152 of the rod member 150. Specifically, when the earmuff 10 rotates on the rotation axial direction Z1, the positioning member 170 also rotates, and the rotation range may be limited by the interference of the baffle plate 171 and the sleeve 160. In the embodiment, the rotation range of the rotation angle of the earmuff 10 of the headphone 1 on the rotation axial direction Z1 is, for example, 90 degrees inward and 15 degrees outward, but the disclosure is not limited thereto.

To sum up, in the headphone of the disclosure, when the external force is applied to the earmuff and causes the earmuff to expand outward in the second axial direction, the earmuff drives the base so that the protrusions move in the guiding grooves and push the sliding blocks to move along the first axial direction to compress the elastic members. When the external force is removed, the earmuff is reset by the elastic force of the elastic members. In this way, the headphone can improve the adjustment freedom of the earmuff, and may greatly reduce the manufacturing cost.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. A headphone, comprising a headgear and two earmuffs connected to opposite ends of the headgear, and each of the earmuffs comprising:

an adjustment assembly, comprising:

a base, having two opposite accommodating parts and two guiding grooves;

two elastic members, disposed in the accommodating parts, respectively, and the elastic members extending along a first axial direction;

two protrusions, slidably connected to the guiding grooves, respectively, and protruding into the accommodating parts; and two sliding blocks, disposed in the accommodating parts, respectively, and each of the sliding blocks being respectively connected between the corresponding protrusion and the corresponding elastic member, wherein when an external force is applied to each of the earmuffs and causes each of the earmuffs to expand outward at an angle in a second axial direction, each of the earmuffs drives the corresponding base, so that each of the protrusions moves in each of the guiding grooves, and pushes each of the sliding blocks to move along the first axial direction to compress each of the elastic members, when the external force is removed, each of the earmuffs is reset by elastic force of each of the elastic members.

2. The headphone according to claim 1, wherein each of the earmuffs further comprises:

a shell, having an open end and a bottom wall; and a front cover, covering the open end of the shell, wherein each of the adjustment assemblies is respectively connected between the headgear and the corresponding bottom wall.

3. The headphone according to claim 2, wherein each of the earmuffs further comprises:

a speaker, disposed in an accommodating space jointly formed by the shell and the front cover, the speaker having a sound outlet surface, the sound outlet surface of the speaker facing an inner surface of the front cover, and the inner surface facing the bottom wall.

4. The headphone according to claim 1, wherein each of the guiding grooves has a first section and a second section connected to the first section, the first section is parallel to the first axial direction, and the second section extends from an end of the first section in a direction inclined to the first axial direction.

5. The headphone according to claim 4, wherein each of the sliding blocks has an inclined surface and a bottom surface, each of the bottom surfaces is connected to one end of each of the elastic members, and each of the inclined surfaces is inclined to the first axial direction.

6. The headphone according to claim 5, wherein each of the inclined surfaces abuts against each of the protrusions, when the external force is applied to each of the earmuffs, each of the protrusions moves from the first section to the second section, and moves from a first abutting position to a second abutting position of the inclined surface to push each of the sliding blocks, and a first distance between the first abutting position and the bottom surface is smaller than a second distance between the second abutting position and the bottom surface.

7. The headphone according to claim 5, wherein the base further comprises two first sidewalls and two second sidewalls connected to the first sidewalls, each of the guiding grooves is formed on each of the first sidewalls, each of the second sidewalls corresponds to each of the bottom surfaces, and each of the second sidewalls is connected to the other end of each of the elastic members.

8. The headphone according to claim 7, wherein extending directions of the second sidewalls are parallel to the second axial direction, and extending directions of the first sidewalls are parallel to the first axial direction.

9. The headphone according to claim 7, wherein each of the adjustment assemblies further comprises:

a rod member, having a first end and a second end that are opposite to each other, the first end being connected to the headgear, and an extending direction of the second end having a rotation axial direction; and a sleeve, disposed between the accommodating parts of the base, the sleeve comprising two pivot parts and having a hollow part, the second end being connected to the hollow part, and the pivot parts being pivotally connected to the first sidewalls.

10. The headphone according to claim 9, wherein each of the adjustment assemblies further comprises:

a positioning member, sleeved on a part where the second end passes through the hollow part, and the positioning member comprising a baffle plate, configured to restrict a rotation angle of each of the earmuffs on the rotation axial direction of the second end.

* * * * *